(12) United States Patent
Muraki et al.

(10) Patent No.: US 7,040,813 B2
(45) Date of Patent: May 9, 2006

(54) ROLLING BEARING APPARATUS FOR SWING ARM

(75) Inventors: Hiromitsu Muraki, Fujisawa (JP); Kenji Takei, Fujisawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/159,973

(22) Filed: May 30, 2002

(65) Prior Publication Data
US 2002/0181819 A1  Dec. 5, 2002

(30) Foreign Application Priority Data
May 30, 2001  (JP) ............................. 2001-161903

(51) Int. Cl.
*F16C 19/08*  (2006.01)
(52) U.S. Cl. ...................... 384/613; 384/517

(58) Field of Classification Search ................ 384/613, 384/512, 615, 619, 517
See application file for complete search history.

(56) References Cited

U.S. PATENT DOCUMENTS

| 5,509,198 A | 4/1996 | Takamizawa et al. |
| 5,803,618 A * | 9/1998 | Obara et al. ................ 384/512 |
| 6,010,247 A | 1/2000 | Mouri et al. |

* cited by examiner

*Primary Examiner*—Lenard A. Footland
(74) *Attorney, Agent, or Firm*—Katten Muchin Rosenman LLP (57) ABSTRACT

A pair of pre-loaded ball bearings 1, 2 are fixed to a shaft 3 having a flange 3a to be a reference surface Q formed on one end, and where a clearance C is secured between the surface 1c on the flange side of the inner race 1b of the bearing 1 on the side of the flange 3a and the flange surface 3b.

13 Claims, 7 Drawing Sheets

ROLLING BEARING APPARATUS FOR SWING ARM

BACKGROUND OF THE INVENTION

1. Field of the Invention

This invention relates to a rolling bearing apparatus, such as a bearing apparatus for the swing arm of a magnetic disk drive or hard disk drive (HDD), that is suitable to be used in locations where there is high-speed small rocking motion.

2. Description of the Related Art

Figure 5:
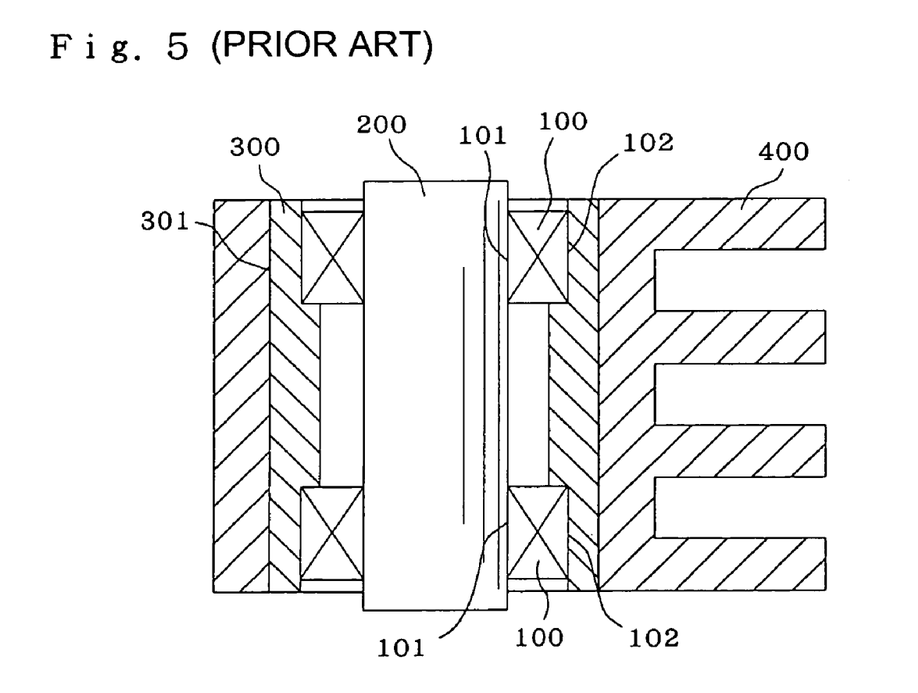
FIG. 5 is a cross sectional view of an example of the prior art rolling bearing apparatus.

In the case of the prior art bearing apparatus for a swing arm as shown in FIG. 5 where the left side is the VCM side, the pivot unit comprises a pair of grease-sealed ball bearings 100, a shaft 200 and a housing 300, and pre-loading is applied to the ball bearings 100.

In the case of this prior art bearing apparatus, the pair of ball bearings 100 have an inner race 101 and outer race 102, respectively, and adhesive is applied to four locations on the inner-diameter surface of the inner races 101 and the outer-diameter surface of the outer races 102 in the pair of ball bearings 100, to form the pivot unit, where the inner races 101 and outer races 102 are fastened to the shaft 200 and the housing 300, respectively.

Also, adhesive is applied to the outer-diameter surface 301 of the housing 300 of the pivot unit, which is constructed as mentioned above, and the pivot unit is fastened to the swing arm 400 in which a voice coil motor (VCM) is installed (on the left side in the figure). The pivot unit can be fastened with a bolt instead of adhesive.

Also, in order to apply the pre-load to the rall bearings 100, a method of controlling the load (loading by dead weight or spring force) or a method of controlling the axial rigidity (resonance) have been proposed (for example Japanese Patent Publication No. Toku Kai Hei 6-221326, U.S. Pat. No. 5,509,198).

Recently, there is an increasing demand for higher-density magnetic disk drives. In order to accomplish this, the track width of the tracks for recording signals on the disk have become increasingly more narrow, and therefore there is a demand to increase the speed for accessing a target track by the swing arm in which the head for recording and reproducing the signals is installed, as well as increase the positioning precision of the swing arm. Moreover, as the track width becomes narrower, it is desired that the amount that the magnetic head floats above the disk be decreased.

In order to do this, the height of the reference surface where the pivot unit is installed on the base (partly shown on the right side in FIGS. 6 to 10), and the height of the reference surface where the swing arm is installed must be precisely controlled.

Furthermore, as devices become more compact and thinner, particularly in the case of the HDD used in a notebook PC or mobile terminal that is 2.5 inches or less, there is a big demand to make the pivot unit more compact. In other words, in order to satisfy the demand for faster and more precise control as well as a more compact device, for the ball bearings that support the swing arm 400, it is desired that the assembly height T between the reference surface Q of the flange 201 (surface abutting to the base 700) in the shaft 200, and the reference surface P for swing arm installation (see FIGS. 6 to 10) be controlled and made more compact.

Figure 7:
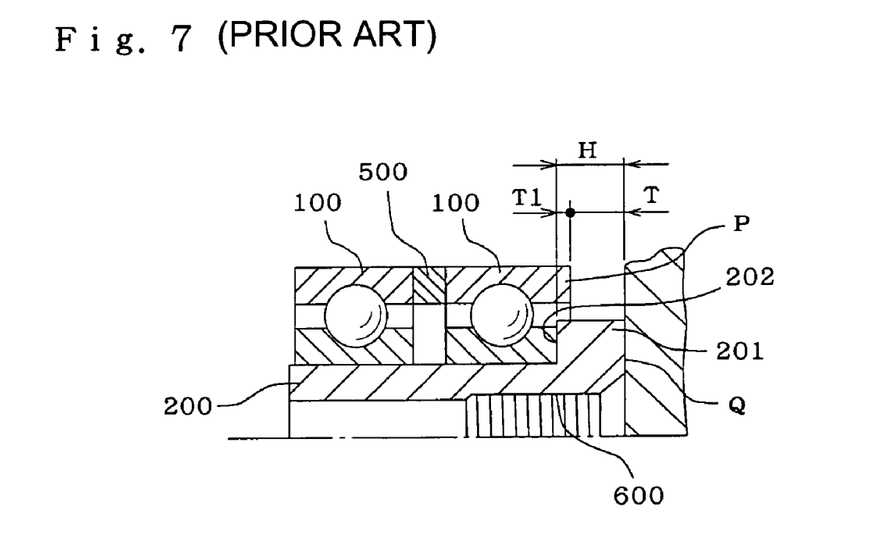
FIG. 7 is a cross sectional view of another example of the prior art rolling bearing apparatus.
Figure 8:
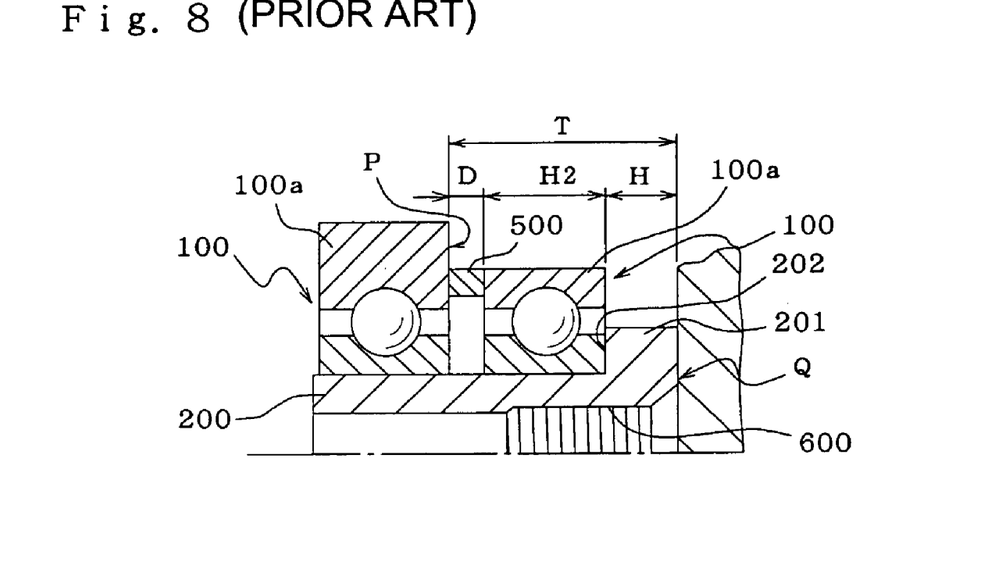
FIG. 8 is a cross sectional view of another example of the prior art rolling bearing apparatus.

In the figures, B is the distance from the reference surface P for swing arm installation of the housing 300 to the abutting surface 100b of the outer race 100a of the bearing 100 on the side of flange 201, H is the thickness of the flange 201, H2 is the height of the bearing 100, Ti is the difference in between the outer and inner races with reference to the front surface facing the base (in FIGS. 7 and 9) and D is the width of the spacer (in FIG. 8).

In FIGS. 6 to 10, the retainer, which keeps the balls of the bearing 100 evenly spaced, and the seal, which prevents lubrication from scattering, and the swing arm 400 are not shown.

In the figures, a fastening screw 600 is threaded into the shaft 200.

Figure 6:
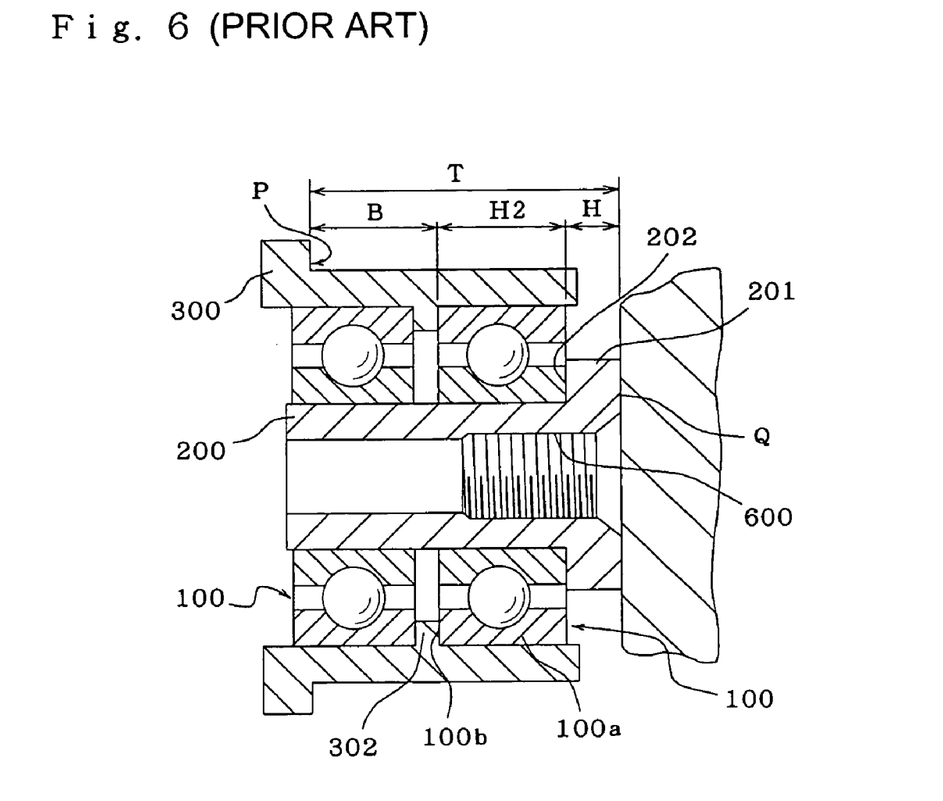
FIG. 6 is a cross sectional view of another example of the prior art rolling bearing apparatus.

FIG. 6 shows an example of using a housing 300 having an stepped inner diameter portion 302, and FIG. 7 and FIG. 8 show an example of using a spacer 500 between the pair of ball bearings 100 with no housing used. FIG. 5 is an example of outer races 100a having differing outer diameters.

The prior art bearing apparatus for a swing arm shown in FIG. 6 to FIG. 10 is constructed such that the inner race 101 of the ball bearing 100 on the side of flange 201 comes in contact with the flange surface 202 of the flange 201, and the height T between the reference surface Q of the flange 201 (to be mounted to the base) and the reference surface P of the swing arm installation is controlled by processing the each of the parts with high precision, however the cost was high.

Figure 9:
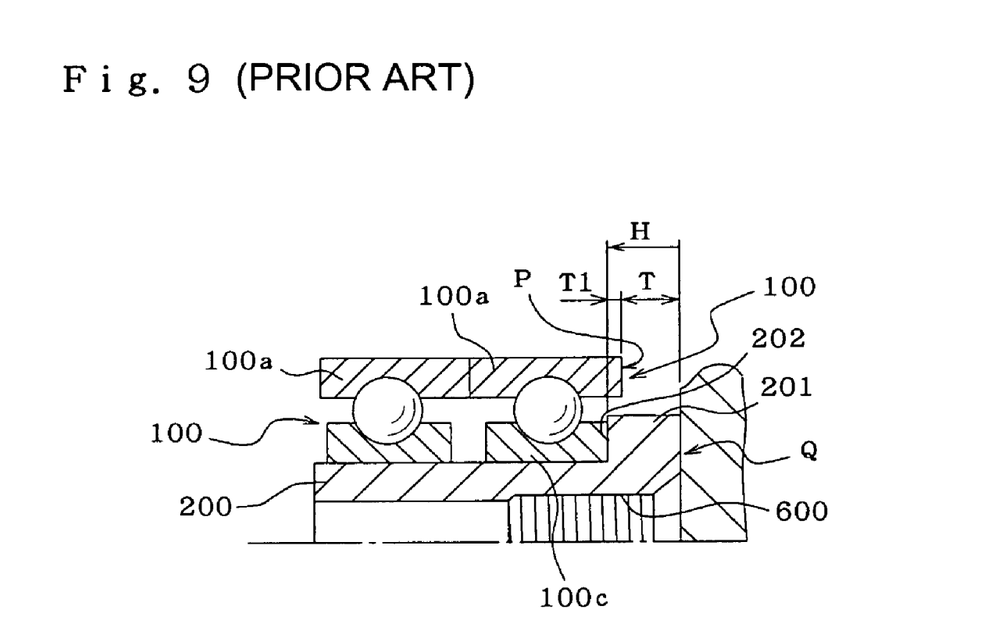
FIG. 9 is a cross sectional view of another example of the prior art rolling bearing apparatus.
Figure 10:
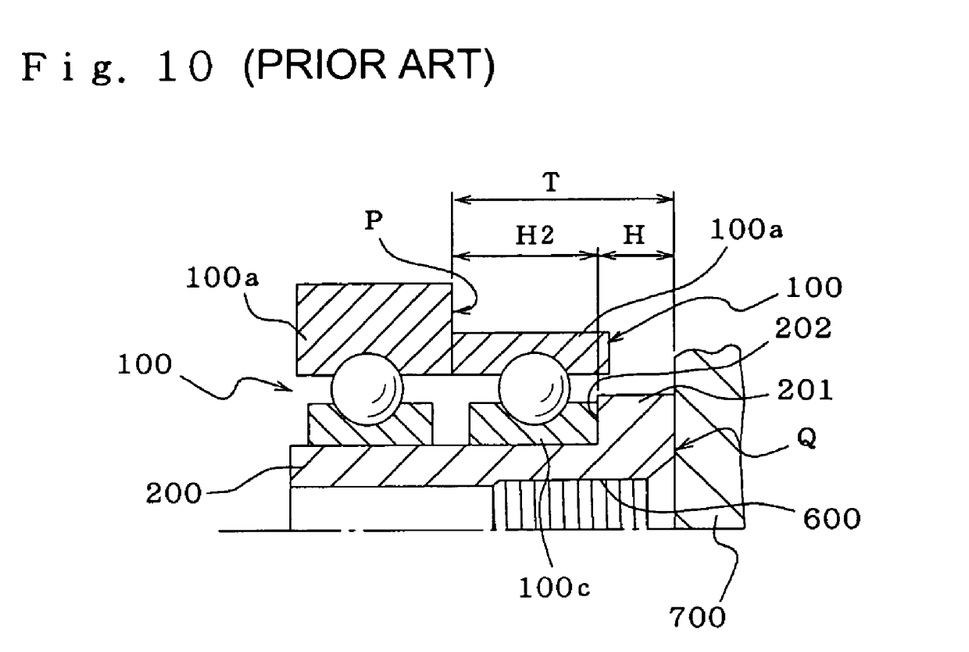
FIG. 10 is a cross sectional view of another example of the prior art rolling bearing apparatus.

Moreover, the so-called outer-race contact type is proposed e.g. by U.S. Pat. No. 6,010,247 in order to make the rolling bearing apparatus more compact. For example, the stepped section 302 on the inner diameter side of the housing 300 and the spacer 500 is done away with, and the end surfaces of the pair of outer races 100a come in contact with each other, and one of the inner races 100c comes in contact with the flange surface 202 of the flange 201 that is formed on the shaft 200. FIG. 9 shows the case of no housing and no spacer, and FIG. 10 shows the case of outer races have differing outer diameters and no spacer.

However, in this method as well, all of the parts must be processed with high precision and thus the cost is high. In other words, in order to accomplish this method, the tolerances for the thickness H of the flange 201, the height H2 of the ball bearing (including the difference T1 with the front surface), the housing dimension B (distance from the reference surface P for swing arm installation of the housing 300 to the contact surface 100b of the outer race 100a of the ball bearing 100 on the flange side), and the spacer width D are all added together, so the bearing apparatus must be selectively assembled by (1) reducing the tolerance range of each part and (2) measuring the tolerance of each part.

SUMMARY OF THE INVENTION

Taking into consideration the problems existing in the prior art technology described above, it is an object of this invention to provide a rolling bearing apparatus, particularly for a 2.5-inch or less HDD, in which the assembly height between the reference surface of the shaft flange and the reference surface for swing arm installation is controlled and made compact.

BRIEF DESCRIPTION OF THE DRAWINGS

FIGS. 1(*a*) and 1(*b*) are a cross sectional view of a first embodiment of the present invention.

FIGS. 2(*a*) and 2(*b*) are a cross sectional view of a second embodiment of the present invention.

FIGS. 3(*a*) and 31(*b*) are a cross sectional view of a third embodiment of the present invention.

DESCRIPTION OF THE PREFERRED EMBODIMENTS

Figure 1A:
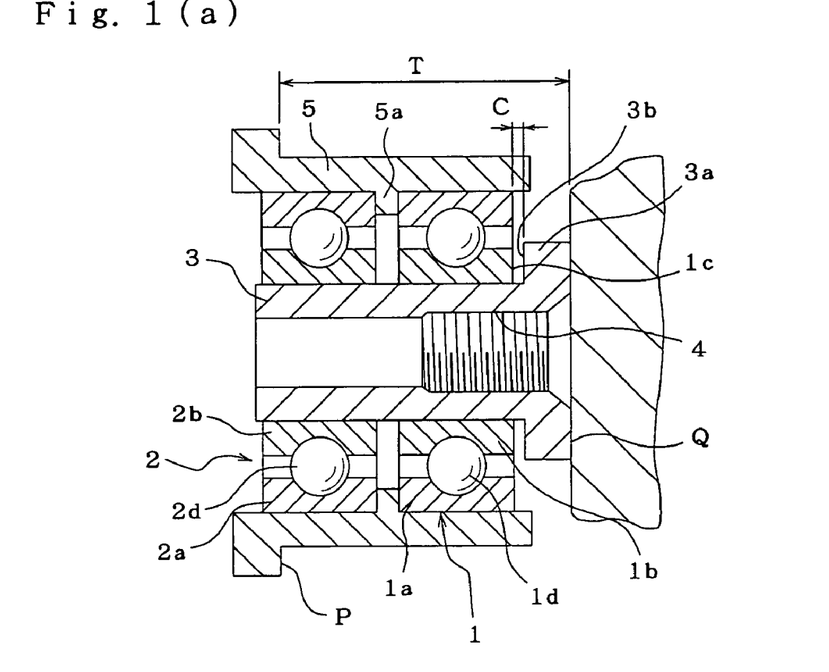
Figure 1B:
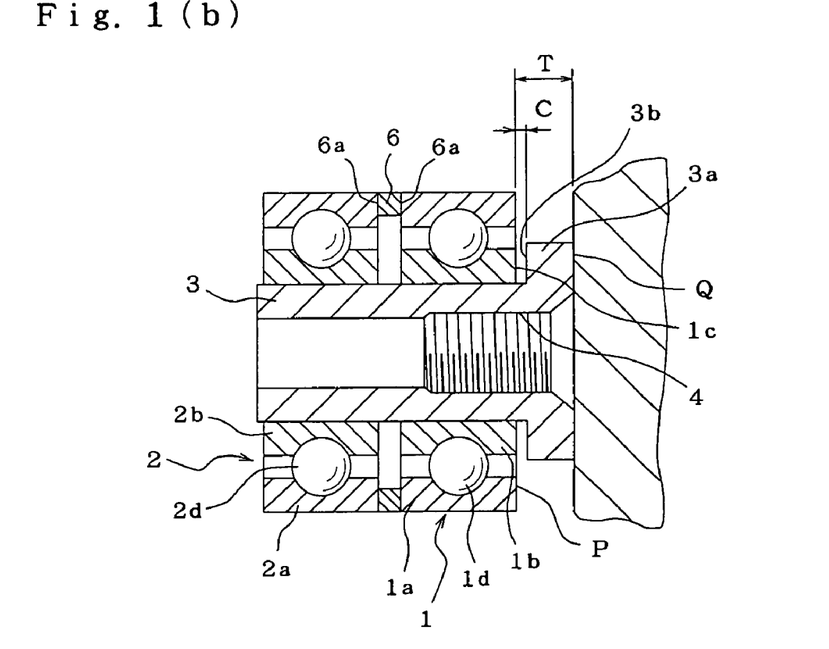

In order to accomplish the aforementioned objective, this invention comprises a pair of pre-loaded bearings that are fixed to a shaft having a reference surface, specifically, flange surface, formed on one end, and where a clearance is maintained between the surface on the flange side of the inner race on the flange side and the flange surface,. The preferred embodiments of the rolling bearing apparatus for a swing arm of this invention, or in other words, the pivot unit on which the swing arm is installed, is explained based on the drawings. The embodiments of the invention are not limited to the embodiments described here. In the embodiments shown in FIGS. 1(*a*) and 1(*b*) to FIG. 4, the swing arm is omitted in the drawings.

FIG. 1(*a*) and FIG. 1(*b*) show a first embodiment of the invention. FIG. 1(*a*) shows the case where a housing 5 is used, and FIG. 1(*b*) shows the case where no housing is used. FIG. 1(*a*) and FIG. 1(*b*) show a first ball bearing 1, a second ball bearing 2, a shaft 3, housing 5 and spacer 6. The shaft 3 is formed with a flange 3*a*, and the first ball bearing 1 is located on the side of the flange 3*a*. In the embodiment shown in FIG. 1*a*, the lubricant-sealed first ball bearing 1 and second ball bearing 2 are pressure fitted around the shaft 3 and housing 5. The flange 3*a* having an arbitrary protruding width is formed around one end of the shaft 3 and it becomes the reference surface Q. Indicated by the reference numeral 4 in the figure is a fastening screw.

The housing 5 has a flange-shaped reference surface P on one end for swing arm installation, and there is a protruding stepped section 5*a* formed around its inner-diameter surface. The first ball bearing 1 and second ball bearing 2 comprise outer races 1*a*, 2*a*, inner races 1*b*, 2*b*, a plurality of balls 1*d*, 2*d* that are located between the outer race 1*a*, 2*a* and inner race 1*b*, 2*b*, respectively, a retainer (not shown in the figure) that hold the balls 1*d*, and a seal plate (not shown in the figure). The inner race 1*b* has an end surface 1*c* on the flange side facing a flange surface 3*b* of the flange 3*a*. There is a clearance C between the end surface 1*c* on the flange side of the inner race 1*b* of the first ball bearing 1 and the flange surface 3*b* of the shaft 3. The size of this clearance C is set within the range of from 0.01 mm to 0.5 mm. For example, when the size of the clearance C exceeds 0.5 mm, there is a problem that the total width of the pivot unit becomes large, while when the side of the clearance C is less than 0.01 mm, there may be any interference between the mating surfaces, and so it is preferred that the clearance C be kept between a minimum value of 0.01 mm and a maximum value of 0.5 mm.

The first and second ball bearings 1, 2 are not limited to this embodiment, and their design can be changed to another know construction that is within the range of the present invention. The lubricant is oil or grease. Moreover, the seal (including a contact or non-contact seal and shield) can be a seal on both sides or on one side, the retainer (also called the cage) material can be a steel cage or plastic and the bearing material can be bearing steal or stainless steel. The design of each can be changed within the range of the invention.

First, with the first ball bearing 1 pressure fitted inside the housing 5, the inner race 1*b* of the first ball bearing 1 is pressure fitted around the shaft 3. When doing this, assembly is performed using a jig and sensor that controls the assembly height T between the reference surface P for swing arm installation of the housing 5 and the reference surface Q of the shaft flange 3*a*.

Next, the second ball bearing 2 is pressure fitted inside the housing 5 and around the shaft 3. Furthermore, a method of controlling the axial rigidity (resonance) is adopted to apply a pre-load to the bearings. In other words, the inner race 2*b* is pressure fitted while monitoring the axial resonance of the end surface of the outer race 2*a* until it reaches the desired axial resonance. Since there is a clearance C formed between the end surface 1*c* on the flange side of the inner race 1*b* of the first ball bearing 1 and the flange surface 3*b* of the shaft 3, it is possible to control the assembly height T using the jig and sensor when pressure fitting the first ball bearing 1 around the shaft 3. By doing this, it is possible to keep the cost of the rolling bearing apparatus low without the need of very accurately processing the flange thickness H, bearing height H2 (including the difference T1 between the outer and inner races, with reference to the front surface mating the flange), housing dimension B (distance from the reference surface P for swing arm installation of the housing 300 to the contact surface 100*b* of the outer race 100*a* of the bearing 100 on the flange side as shown in FIG. 6), and spacer width D. Thus it is possible to accurately control the height of the base and head, as well as make the rolling bearing apparatus more compact.

In this embodiment, the shaft 3 and inner races 1*b*, 2*b*, and housing 5 and outer races 1*a*, 2*a* are shown to be pressure fitted, however, it is also possible to join them using a loose or light clamp fit or fasten them using adhesive.

Moreover, in the embodiment shown in FIG. 1*b*, a housing 5 in FIG. 1*a* is not used, and a spacer 6 is placed between the first ball bearing 1 and second ball bearing 2. For example, an adhesive can be applied to both end surfaces 6*a* of the spacer 6 and bonded and fastened to the outer race 1*a* of the first ball bearing 1 and the outer race 2*a* of the second ball bearing 2. The space 6 can be of well known construction. The other construction and effect are substantially the same as in the case described for FIG. 1(*a*) above.

Figure 2A:
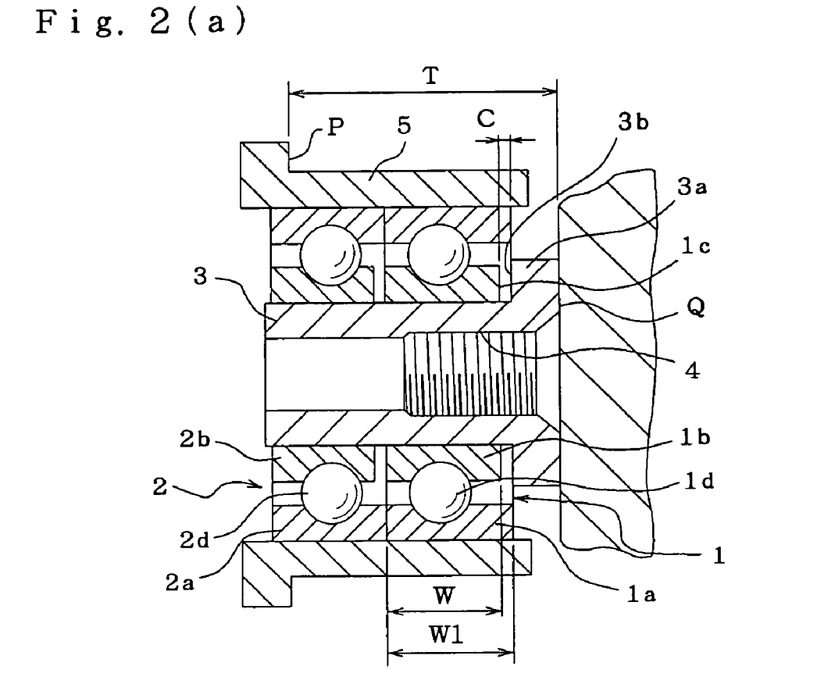
Figure 2B:
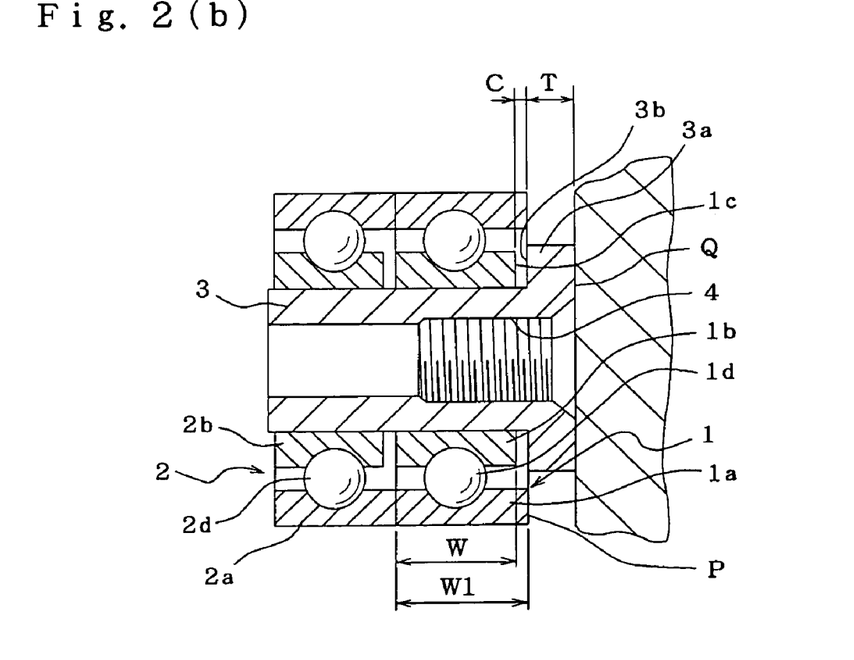

FIG. 2(*a*) and FIG. 2(*b*) show a second embodiment of the invention. FIG. 2(*a*) shows the case of using a housing 5 and FIG. 2(*b*) shows the case of using no housing. The main construction of this embodiment are substantially the same as those of the first embodiment, so only the part that is a feature of this embodiment is explained here.

This embodiment differs from the first embodiment in that it does not use the stepped section 5*a* on the inner-diameter side of the housing 5 and the spacer 6 which are used in the first embodiment. Also, in this embodiment, in order to form a clearance C between the end surface 1*c* on the flange side of the inner race 1*b* of the first ball bearing 1 and the flange surface 3*b* of the shaft 3, the width W of the inner race 1*b* on the flange side is made to shorter than the width W1 of the outer race 1*a* with the ball 1*d* as the center of W1. It is also possible to make both short, and it is possible to change the design as necessary. The other construction and effect of the embodiment are substantially the same as those of the first embodiment described above.

Figure 3A:
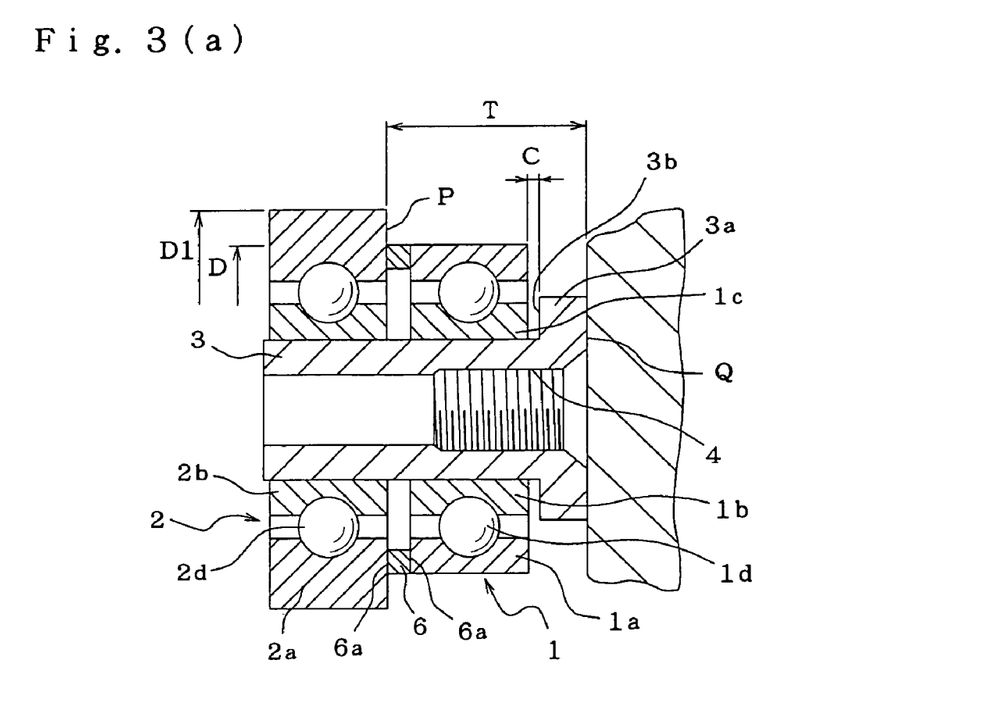
Figure 3B:
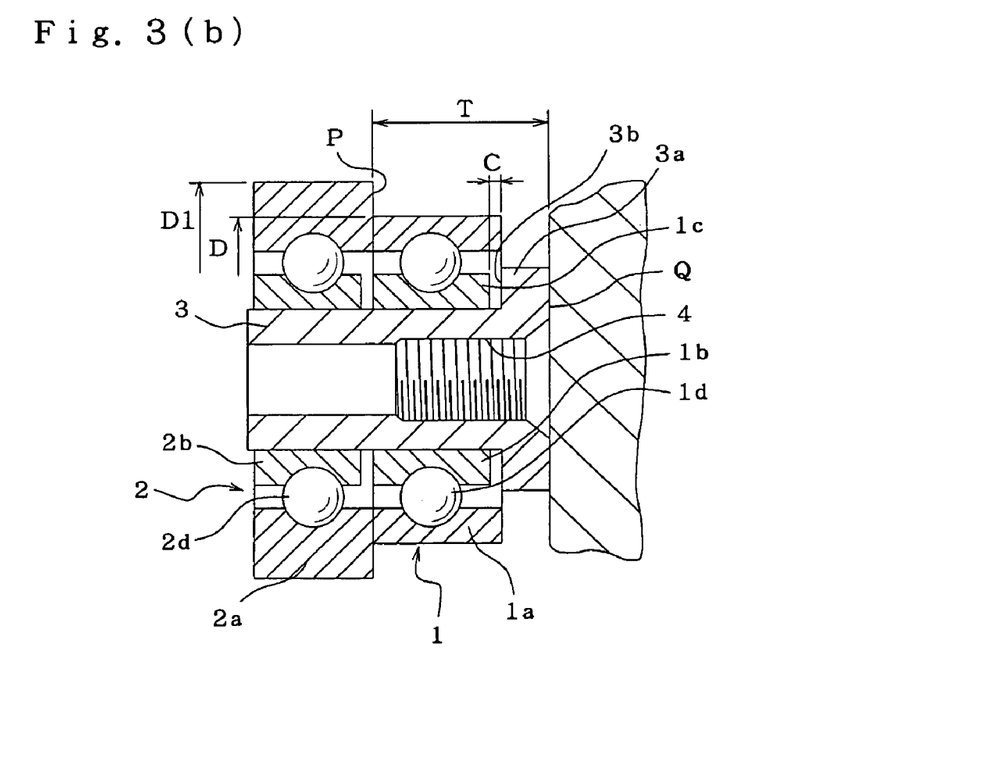

FIG. 3(a) and FIG. 3(b) show a third embodiment of the invention, where FIG. 3(a) is the case of using a spacer 6 and FIG. 3(b) is the case of using no spacer. The main construction of this embodiment is substantially the same as that of the first embodiment, so only the part that is a feature of this embodiment is explained here.

This embodiment differs from the first embodiment in that the housing 5 is not used, and outer diameters D, D1 of the outer races 1a, 2a of the first ball bearing 1 and second ball bearing 2 are different such that the outer diameter D1 of the outer race 2a of the second ball bearing 2 is large and the end surface of the outer race 2a of the second ball bearing 2 is taken to be the reference surface P for swing arm installation. With this embodiment, it is possible to reduce the number of parts, and thus it is possible to easily improve the precision of the swing arm installation (perpendicularity). The other construction and effect of the embodiment are substantially the same as those of the first embodiment described above.

Figure 4:
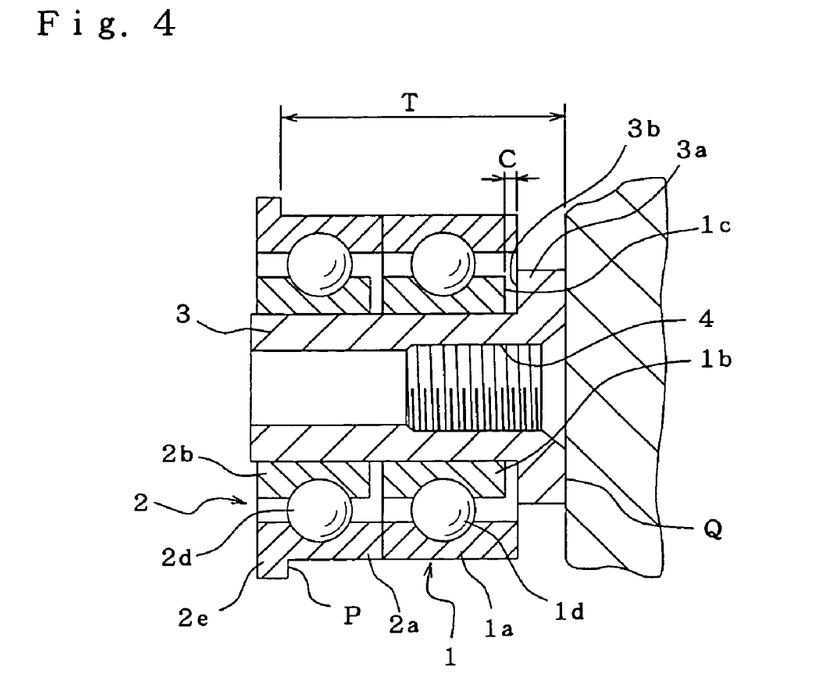
FIG. 4 is a cross sectional view of a fourth embodiment of the present invention.

FIG. 4 shows a fourth embodiment of the invention. The main construction of this embodiment is substantially the same as that of the second embodiment shown in FIG. 2(b), so only the part that is a feature of this embodiment is explained here.

This embodiment differs from the second embodiment shown in FIG. 2(b) in that a flange 2e is formed around the outer diameter of the outer race 2a of the second ball bearing 2, and the end surface of this flange 2e is taken to be the reference surface P for swing arm installation. With this embodiment, it is to easily improve the precision of the swing arm installation (perpendicularity). The other construction and effect of the embodiment are substantially the same as those of the first embodiment described above.

With this invention, the flange 3a that functions as a reference surface Q is formed at one end of the shaft 3 and the two pre-loaded bearings 1, 2 are then fastened to the shaft 3, and by maintaining a clearance C between the end surface 1c on the flange side of the inner race 1b on the flange side and the flange surface 3b, it is possible to assemble the rolling bearing apparatus while controlling the assembly height between the reference surface P for the swing arm installation that contains the pivot head and the reference surface 3b of the shaft flange 3 without having to process each of the parts with high precision. Therefore it is possible to accurately control the height of the base and heads and make the rolling bearing apparatus more compact.

Also, in the case of fastening the inner race and shaft by pressure fitting instead of using an adhesive, it is possible to lower the amount of out gas generated and obtain a highly reliable bearing apparatus.

What is claimed is:

1. A rolling bearing apparatus for swing arm comprising:
   an L-shaped annular member comprising an upright portion and a transverse portion joined at an end of the upright portion, the L-shaped annular member mounted to the base at a base side of the transverse portion, the transverse portion having a first reference surface on the base side and a top surface on the opposite side thereof, and
   a pair of pre-loaded bearings fixed to the upright portion and having an inner race, respectively, such that one of the pair of pre-loaded bearings is located on the side of the transverse portion, and that the inner race of the pre-loaded bearing on the side of the transverse portion has a surface on the side of the transverse portion,
   wherein a clearance is set and secured between the surface on the transverse portion side of the inner race of the pre-loaded bearing on the flange-transverse portion side and the top surface of the flange, said clearance being set to control an assembly height between the first reference surface and a second reference surface of the apparatus.

2. A rolling bearing apparatus in accordance with claim 1, wherein said pair of pre-loaded bearings are recurred within a housing having a protruding stepped section defined between and separating said pre-loaded bearings.

3. A rolling bearing apparatus in accordance with claim 1, wherein said pair of pre-loaded bearings further comprise outer races that are separated by a spacer.

4. A rolling bearing apparatus in accordance with claim 1, wherein the pre-loaded bearing on the transverse portion side further comprises an outer race having a width that is different than the width of the inner race of the pre-loaded bearing on the flange side.

5. A rolling bearing apparatus in accordance with claim 4, wherein the outer race width is greater than the inner race width.

6. A rolling bearing apparatus in accordance with claim 5, wherein the other pre-loaded bearing further comprises an outer race having a width that is different than the width of the inner race of the other pre-loaded bearing.

7. A rolling bearing apparatus in accordance with claim 6, wherein the outer race width of the other pre-loaded bearing is greater than the inner race width of the other pre-loaded bearing.

8. A rolling bearing apparatus in accordance with claim 1, wherein the pre-loaded bearings have outer races, respectively, and wherein the outer race of one of said pre-loaded bearings has a diameter that is greater than that of the other pre-loaded bearing outer race.

9. A rolling bearing apparatus in accordance with claim 8, wherein said other pre-loaded bearing outer race is defined on the pre-loaded bearing on the flange side.

10. A rolling bearing apparatus for swing arm comprising:
    a shaft having a flange on one end thereof, the flange mounted to a base and having a first reference surface on the base side and a flange surface on the opposite side thereof, and
    a pair of pre-loaded bearings fixed to the shaft and having an inner race, respectively, such that one of the pair of pre-loaded bearings is located on the side of the flange, and that the inner race of the pre-loaded bearing on the side of the flange has a surface on the side of the flange,
    wherein a clearance is set and secured between the surface on the flange side of the inner race of the pre-loaded bearing on the flange side and the flange surface of the flange, said clearance being set to control an assembly height between the first reference surface and a second reference surface of the apparatus,
    wherein the pre-loaded bearing on the flange side further comprises an outer race having a width that is different than the width of the inner race of the pre-loaded bearing on the flange side, and
    wherein the outer race width is greater than the inner race width.

11. A rolling bearing apparatus in accordance with claim 10, wherein the other pre-loaded bearing further comprises an outer race having a width that is different than the width of the inner race of the other pre-loaded bearing.

12. A rolling bearing apparatus in accordance with claim 11, wherein the outer race width of the other pre-loaded bearing is greater than the inner race width of the other pre-loaded bearing.

13. A rolling bearing apparatus for swing arm comprising:

an L-shaped annular member wherein one leg of the L-shaped annular member is a shaft and the other leg is a flange and the flange being fixedly mounted to a base and having a first reference surface on the base side and a flange surface on the opposite side thereof, and a pair of pre-loaded bearings fixed to the shaft and having an inner race, respectively, such that one of the pair of pre-loaded bearings is located on the side of the flange, and that the inner race of the pre-loaded bearing on the side of the flange has a surface on the side of the flange.

* * * * *